J. P. TARBOX.
METHOD OF MAKING RAZOR BLADES.
APPLICATION FILED MAR. 16, 1914.
1,165,037.
Patented Dec. 21, 1915.
5 SHEETS—SHEET 1.
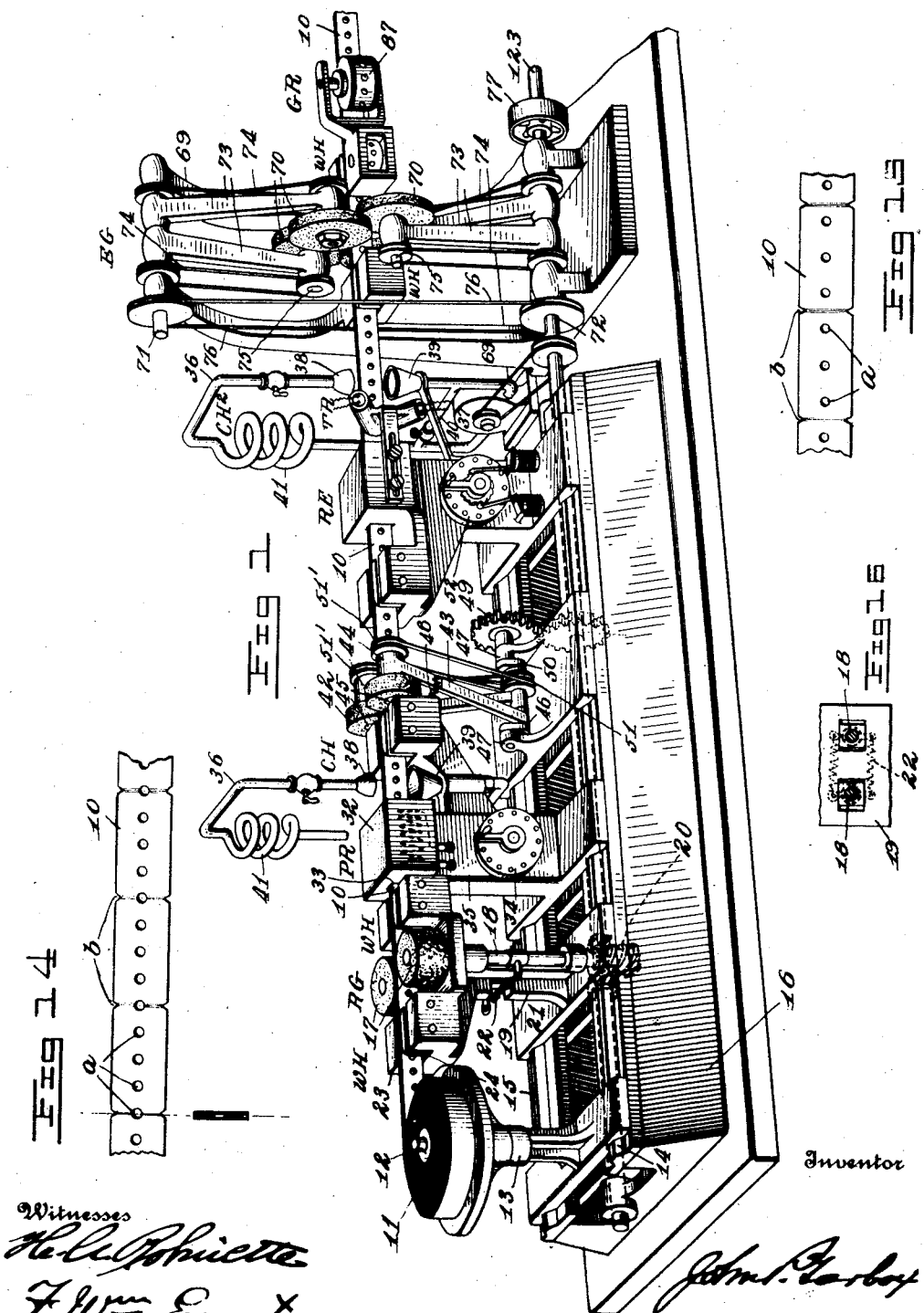

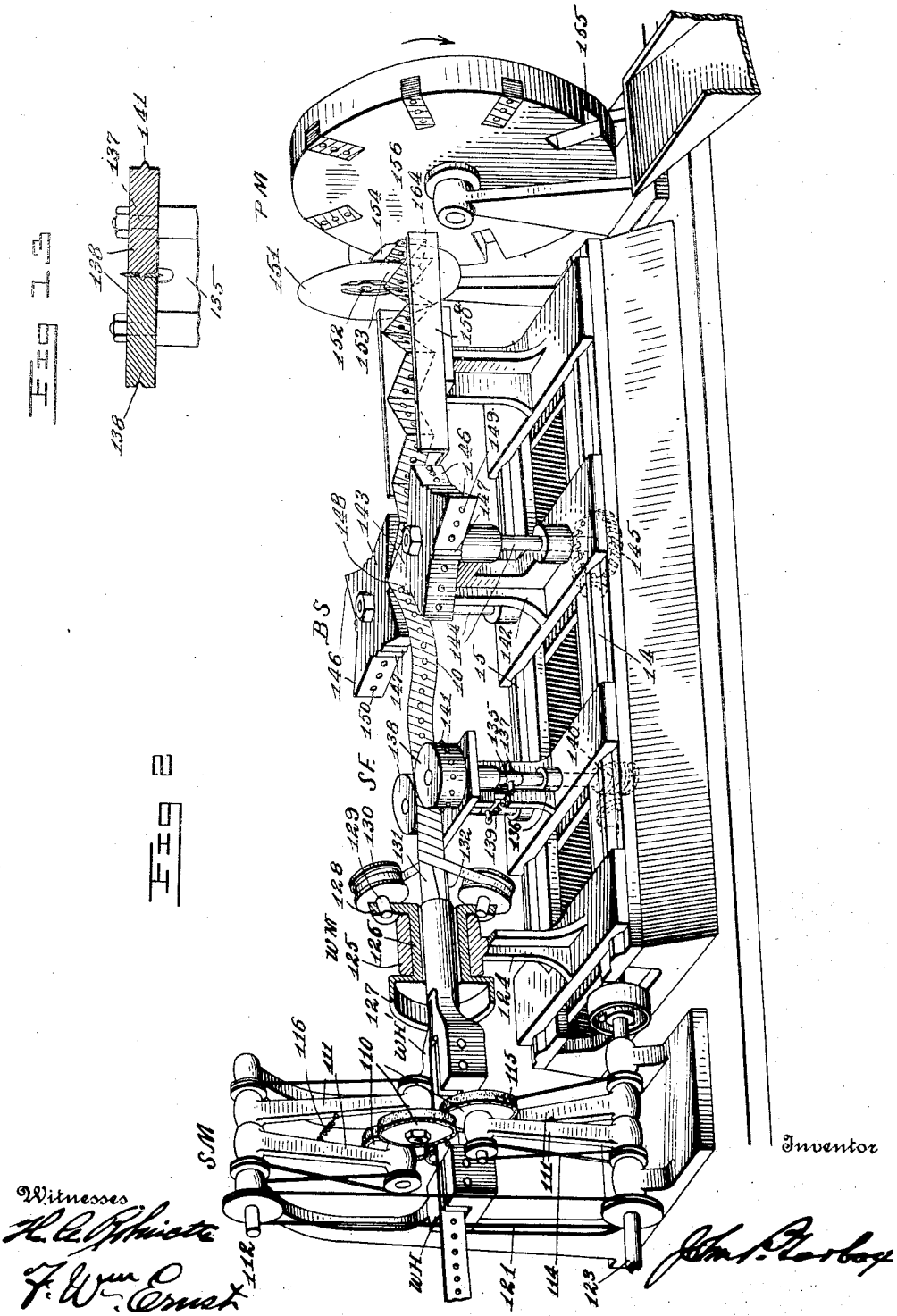

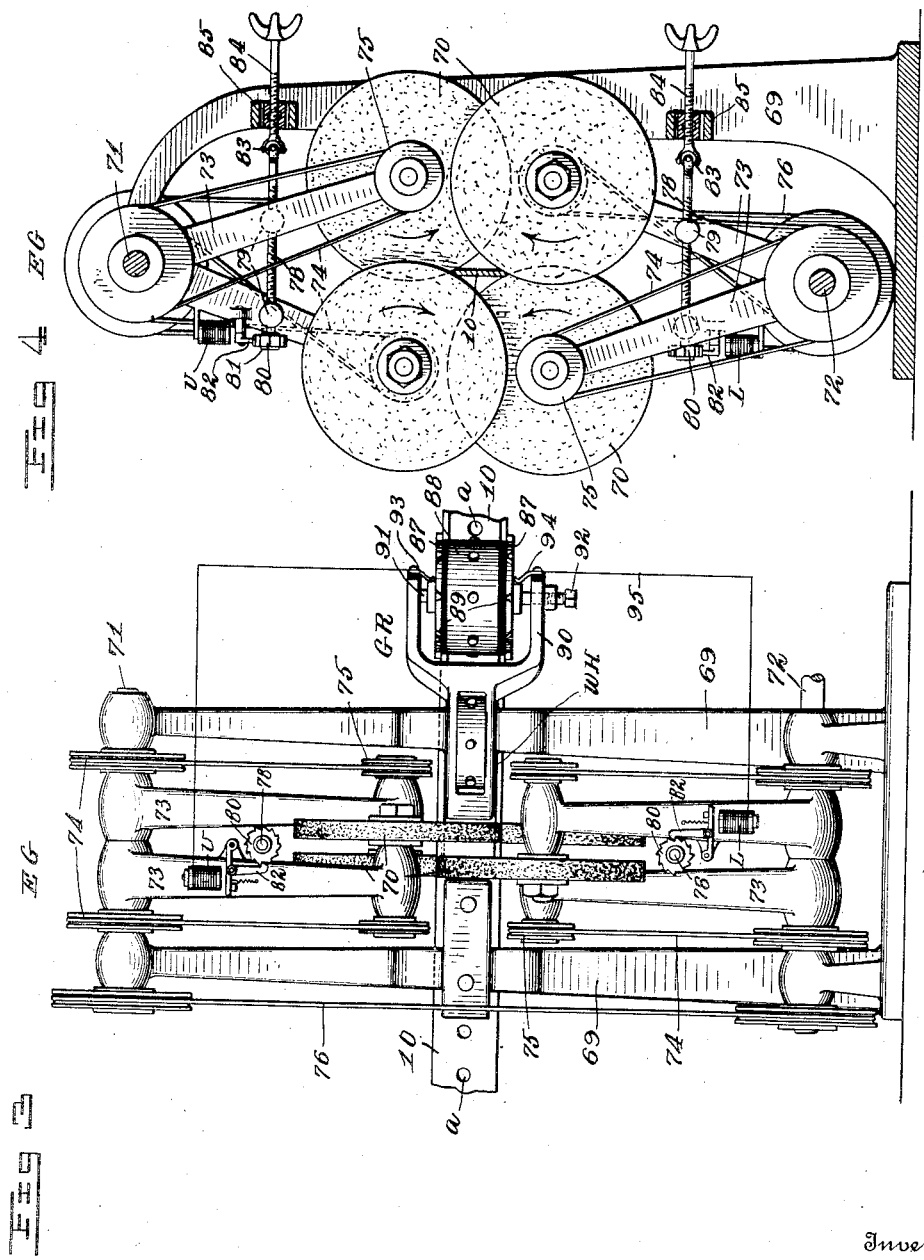

J. P. TARBOX.
METHOD OF MAKING RAZOR BLADES.
APPLICATION FILED MAR. 16, 1914.
1,165,037.
Patented Dec. 21, 1915.
5 SHEETS—SHEET 4.
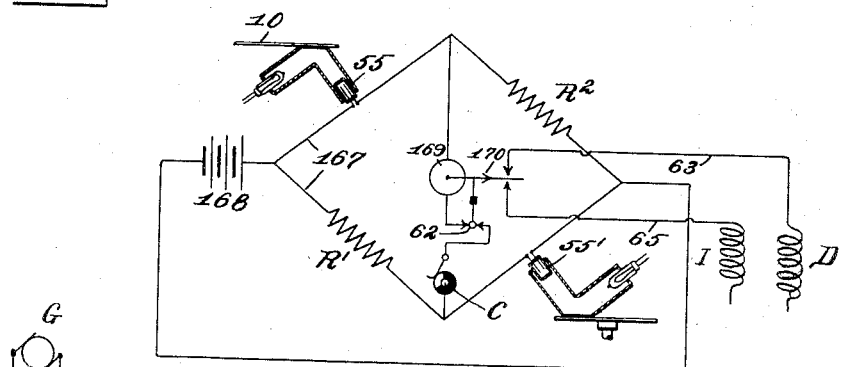
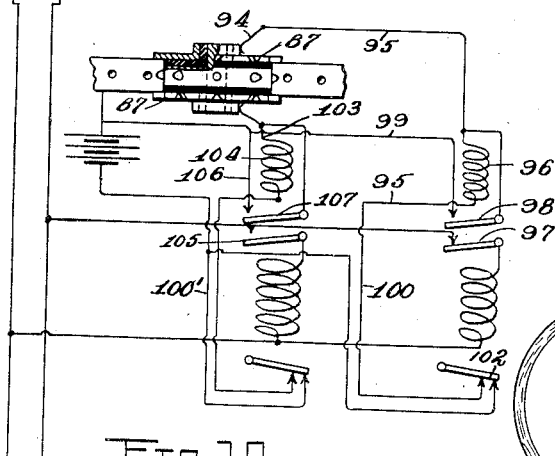
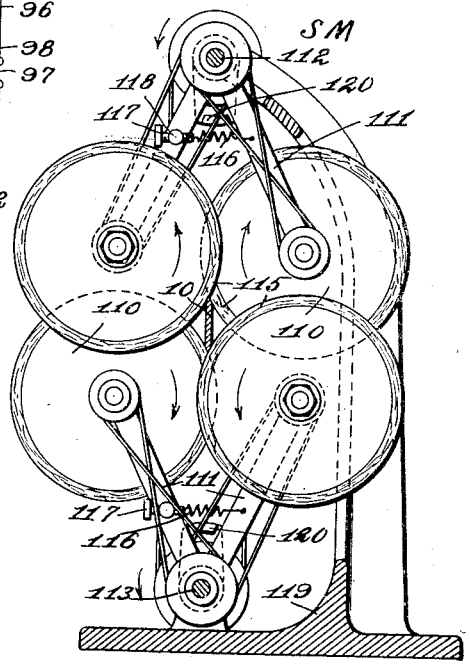
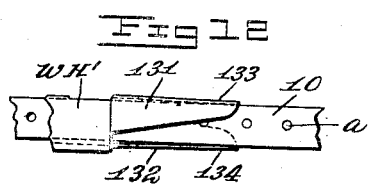
Witnesses
Inventor
John P. Tarbox J. P. TARBOX.
METHOD OF MAKING RAZOR BLADES.
APPLICATION FILED MAR. 16, 1914.
1,165,037.
Patented Dec. 21, 1915.
5 SHEETS—SHEET 5.
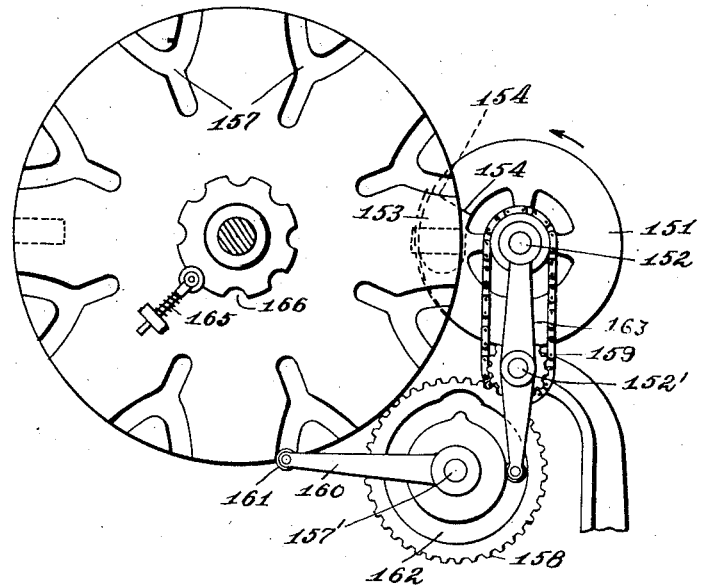
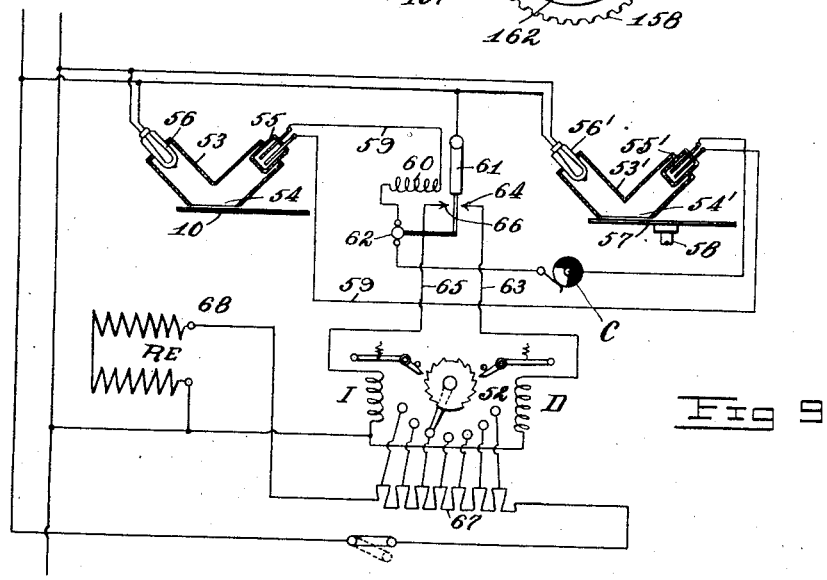
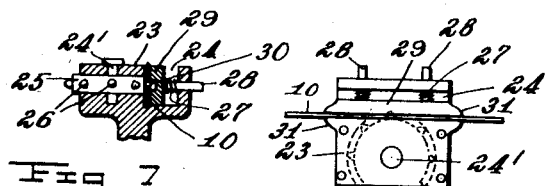

UNITED STATES PATENT OFFICE.

JOHN P. TARBOX, OF WASHINGTON, DISTRICT OF COLUMBIA.

METHOD OF MAKING RAZOR-BLADES.

1,165,037.   Specification of Letters Patent.   Patented Dec. 21, 1915.

Application filed March 16, 1914. Serial No. 825,077.

*To all whom it may concern:*

Be it known that I, JOHN P. TARBOX, a citizen of the United States, residing at Washington, in the District of Columbia, have invented certain new and useful Improvements in Methods of Making Razor-Blades, of which the following is a specification.

The method of my invention is particularly adapted to be used in making safety razor blades, but is not limited to such use inasmuch as any kind of cutlery of a nature similar to razor blades may be made in accordance with this method.

According to the method of my invention the blades are made from strip material in the following manner: The steel of which the blades are to be made is rolled or otherwise formed into long strips of a width substantially equal to the width and thickness of the blade it is desired to make. The strips may be several hundred feet long, and after formation may be coiled up in suitable rolls for storing or shipping and subsequent use. Either simultaneously with the forming of the strips or subsequently thereto, means are formed upon the strip by which it may be supported independently of that edge which is to become the edge of the blades. Preferably apertures or notches are punched in the body of the strip at regular intervals during its formation. Also during the formation of the strip, or subsequently thereto, it is weakened at points approximately a blade length apart by cutting transversely opposite notches in its edges, apertures in its body, or otherwise reducing the section of the strip at regular intervals. Thereupon the strip is supported by means of the support formed upon or within it, and the rough grinding, tempering, fine grinding, honing, stropping, wrapping, counting and packaging operations are performed upon it while it is so supported. Additionally the strip is moved longitudinally from operation to operation, while so supported, by power applied through the provided means for support. And finally upon the completion of the set of blade-forming operations partially recited above upon any strip, another strip is integrally united thereto by brazing or welding or the equivalent, whereby the operations are performed upon the strips endlessly.

The method of my invention may be best understood from a consideration of the manufacture of blades by means of the apparatus which I have invented to carry it out. This apparatus is illustrated in the accompanying drawings, of which—

Figure 1 is a perspective side view of a portion of the apparatus; Fig. 2 is a similar view of the remainder of the apparatus; Figs. 3 and 4 are front and end elevations respectively of the grinding or honing mechanism of the apparatus; Fig. 5 is an end elevation of the stropping mechanism; Fig. 6 is an end elevation of a portion of the packaging mechanism; Fig. 7 is an end elevation in partial transverse section of a work holder; Fig. 8 is a top plan view of the same; Fig. 9 is a diagram of circuit connections used in the temper regulator of the apparatus; Fig. 10 is a similar diagram of the connections of a gage regulating device; Fig. 11 is a diagram of a modified form of circuit connections for the temper regulating device; Figs. 12 and 13 are views of various details; Fig. 14 is an elevation of a portion of the strip ready to be operated upon by the apparatus in fulfilment of the method of my invention; and Fig. 15 is a similar view of a modified form of prepared strip. Fig. 16 is a plan view of the upper bearing block arrangement of shafts 18 of the rough grinding mechanism, and also comprises the arrangement employed in connection with the feeding mechanism.

As clearly shown in Fig. 14 the strip 10 is provided with regularly spaced apertures $a$ centrally of its body. These apertures constitute the means through which the strip may be supported during the action of the apparatus upon it. The distance between adjacent apertures $a$ is preferably equal to the distance between the projections of the holder in which the blade is intended to be used. In a holder of the Gillette type there are three such projections. The apertures $a$ are positioned to suit. The weakened sections of the strip 10 are designated $b$. As illustrated this section has been weakened in three ways; first, by cutting notches in the opposite edges; second, by reducing the thickness thereof along the line $b$; and third, by forming an aperture $a$ on the section line $b$. Any two or any one of these means of weakening the strip 10 at intervals to define the blades may be resorted to. The number of apertures $a$ and their location may be varied to suit any desired conditions, but they are preferably symmetrically located as respects the lines of division $b$.

The strip 10 is shown supported in a roll or coil 11 upon a revolving cable or reel 12 supported upon pedestal 13 from the rail 14 of the pair 14, 15, which supports substantially all of the apparatus. The rails 14, 15 are of the engine lathe type and are themselves supported by suitable benches 16.

RG is a rough grinding mechanism. It comprises a pair of oppositely driven grinding wheels 17, one on each side of the strip 10 and mounted upon a vertically extending driving axle 18 supported from a central pedestal 19 resting upon and secured to but adjustable along the rails 14, 15. The spindles 18 are geared together at their lower ends by cogs 20. Lost motion may be provided in the bearings 21 or spindles 18 in any suitable manner, and the two spindles are drawn toward each other by spiral spring 22 extending between them and having a suitable connection with spindles 18. Any suitable adjusting means may be provided for adjusting the tension of spring 22. The function of the rough grinding mechanism as clearly indicated is to remove the surface irregularities of the strip 10 as it is passed between the wheels 17.

The strip 10 is supported vertically and longitudinally in its passage between the wheels 17 by means of a work holder WH on each side thereof and connected with the central supporting pedestal 19. The work holder consists of a normally fixed block 23 having cut in its upper face a channel 24 through which the work strip 10 is passed. Housed within block 23 (see Figs. 7 and 8) and journaled on pin 24' passing substantially therethrough is a wheel 25 having pin teeth 26. The face of wheel 25 is substantially flush with the inner wall of channel 24, but the pin teeth 26 project out into the channel. Projected from the opposite wall of the channel 24 by springs 27 on a pair of guide pins 28 is a follow block 29. This follow block is grooved longitudinally of its center at 30 to accommodate the projecting pin teeth 26 of wheel 25. The longitudinal extremities 31 of the inner faces of blocks 23 and 29 may be rounded or not. The teeth 26 of wheel 25 are adapted to engage in apertures $a$ of the strip 10 when it is inserted between blocks 23 and 29, and thus support the strip against vertical movement. Preferably teeth 26 are made of highly tempered steel and fit the apertures $a$ very accurately. The block 29 presses the strip 10 closely against the adjacent face of block 23, preventing lateral displacement thereof, and additionally holds the strip substantially in contact with the face of wheel 25, whereby the roots of pin teeth 26, which are largest in diameter, engage within the apertures $a$. The tension of springs 27 may be adjusted by any suitable means. Additionally the work holders may be provided with means for adjusting them longitudinally and laterally as respects the grinding mechanism RG.

PR is an electric preheater. This consists of a box or block 32 of heat insulating material having a centrally disposed tunnel 33 lined with refractory material and through which the strip 10 is passed. Electric heating coils are housed or embedded within the block 32 on each side of the tunnel 33 and closely adjacent the inner walls thereof. This heater is controlled by rheostat 34 of an approved type supported upon pedestal 35 which supports the heater from rails 14, 15 in the same manner as the grinding mechanism RG is supported.

Just beyond the preheater PR is adjusted a chilling bath CH of oil or water. This comprises a circulating pump 37 below the strip 10 having a discharge pipe 36 discharging oil through nozzle 38 substantially in the plane of strip 10, together with a receiving funnel 39 beneath the strip and having a connection with the suction side of the pump. The flow of oil may be regulated by a flow-controlling by-pass 40 or any other suitable means, and if desired a cooling coil or radiator 41 may be included in the pump circuit. If water is used it may of course be supplied direct from the hydrant, and cooling will not be necessary.

Adjoining the chilling bath CH is a pair of emery wheels 42 supported in a transverse plane one on each side of strip 10 by means of frame 43. Frame 43 comprises a pair of arms 44 each of which supports a wheel 42 by a longitudinally extending spindle 45, and both of which are pivotally supported on a common eccentric shaft 46 journaled in bearings 47. The two arms 44 are drawn together by spring 48 and shaft 46 is rotatably driven from gear 49, whereby the wheels 42 are yieldingly drawn against the strip 10 and are at the same time reciprocated vertically. During reciprocation they are driven in opposite directions from shaft 46 by means of belt 50 passed over pulleys 51, 51' on shaft 46 and spindles 45 respectively. The function of this mechanism is to rub the oxid from the chilled strip whereby upon being reheated, the temper may be readily detected. This emery device EM, like the rough grinding mechanism RG is provided with the work holder WH on each side thereof supported from the heater frames, whereby during the polishing operation, the work is rigidly supported.

RE is a reheater. In construction it is essentially like the preheater PR, but is preferably of smaller power. It is supported from rails 14, 15 in a similar manner and like preheater PR is governed by a rheostat 52. Instead of being manually controlled, however, its rheostat is automatically controlled from the temper regulator TR. Referring to Fig. 9 it will be seen that this temper regulator consists of a right angular tube structure 53 with its walls cut away at the point 54 of angle in a plane making equal exterior angles with the two brances of the tube. 55 is a light sensitive cell in the outer end of one branch of the tube. This may be a cell having selenium elements or any other. 56 is an incandescent lamp or other source of light closing the other branch of tube 53. Tube 53 is indicated in Fig. 1 as positioned with the cut away portion of its point 54 closely adjacent or abutting strip 10 as it emerges from the reheater RE. Light rays from source 56 strike strip 10 and are reflected upon the light sensitive cell 55, and the electro-motive force of this cell varies in proportion to the amount of light reflected upon it. Thus assuming the normal temper of the blade desired to be indicated by a straw color, if the color turns to blue, less light is reflected upon cell 55 and the cell is less active, whereas if the straw color fades into white more light is reflected upon cell 55 and it becomes more active. The electromotive force of cell 55 is pitted against the electro-motive force of a similar cell 55' by the potentiometer method. Cell 55' is a part of the device 53', 54', 55', 56', essentially similar to device 53, 54, 55, 56, but the former device instead of being juxtaposed to strip 10 is juxtaposed to a portion of a standard colored disk 57 adjustable about pivot 58 to register at the point 54 a color indicative of any temper desired. Cells 55 and 55' are connected in opposition through circuit 59, so that when their electro-motive forces are equal no current flows. If, however, the electro-motive force of cell 55 is greater or less than that of cell 55', the current flows in one direction or the other through circuit 59. The winding 60 of an electro-magnet acting on a polarized armature 61 is placed in one branch of circuit 59. Armature 61 controls three circuits, the one, 59, by contact 62 through which circuit 59 is opened in each direction of movement of armature 61; the second, 63, through contacts 64, and the third, 65, through contacts 66. Circuit 63 includes an electromagnet D arranged when energized to operate rheostat 52 in a direction to decrease the amount of resistance 67 included in series with the coils 68 of the reheater RE. Circuit 65 on the other hand includes magnet I arranged to operate rheostat 52 in a direction to increase the amount of resistance 67 in circuit with the heating coils 68. Magnets I and D operate upon rheostat 52 through a step-by-step mechanism as shown. Obviously if current passes through coils 60 in one direction armature 61 is repelled and closes circuit 63, thus causing a step-by-step decrease of resistance 67, for each time armature 61 is repelled circuit 59 is opened at contacts 62 and armature 61 returns to its normal position. This continues until the color given strip 10 by reheater RE reflects sufficient light upon cell 55 to equalize its voltage with the voltage of cell 55'. Precisely the opposite is true when current flows through circuit 69 in the opposite direction, closing and opening circuits 65 and 59. It is thus obvious that the temper may be regulated with great accuracy since a variation in reflected light is instantaneous, and the apparatus may be finely adjusted, and operates with great rapidity at the rate of several steps to the second. The delicacy of adjustment of course should be regulated to the rapidity of heating of the coils 68 and the speed of travel of the strip 10. The sources 55, 56 and 55' 56' may of course be made adjustable axially of the tubes if desired.

Immediately adjacent the temper regulating device TR is a second chilling bath $CH^2$, which fixes the regulated temper. Obviously adjustment of temper may be secured by moving the devices PR, CH, RE, TR and $CH^2$ longitudinally of the strip 10 with respect to each other. In fact there are so many means of adjustment that the temper may be adjusted and maintained for a long period of time without the slightest difficulty.

EG is an edge grinding mechanism. It comprises a framework 69 supporting the strip 10 by means of two work holders WH spaced slightly apart and four grinding wheels 70 so arranged that both edges of the blade are ground at the same time. This edge grinder is shown more particularly in Figs. 3 and 4. The wheels 70 are divided into upper and lower pairs supported respectively from upper and lower drive shafts 71, 72 on swinging arms 73, one on each side of each edge of strip 10. They are driven respectively in the directions shown by the arrows by means of belts 74 connecting their spindles 75 with shafts 71. Shafts 71, 72 are inter-connected by belt 76, and power is applied to the lower shaft 72 through pulley 77. As clearly appears from Fig. 3, the wheels of the upper and lower pairs, and the arms 73, which support them, are dodged slightly and face in opposite directions as respects their driving belts and arms 73. Interconnecting the arms 73 of each pair, upper and lower, is a rod 78 having its ends oppositely screw threaded into abutments 79 having a swiveled connection with the arms 73. Connected with one end of rod 78 is a ratchet 80 preferably splined thereon and fixed in longitudinal position by suitable guides 81, and arranged to be acted upon in the one case by the pawl 82 of an electro-magnet U fixed to arm 73, and in the other case by an electro-magnet L fixed to a corresponding arm 73. The opposite ends of rod 78 are connected by means of a ball joint 83 with adjusting screw 84 threaded into an abutment 85 and having a swiveled connection with frame 69. When electromagnet U or L is energized, rod 78 is rotated step-by-step to draw the wheels of the pair of wheels 70 to which the electromagnet belongs together, since opposite ends of rod 78 are oppositely threaded. This adjustment is made step-by-step and is minute. By means of rod 84 the wheels may be adjusted in pairs about axes 71 and 72. By this latter adjustment the edge produced upon the blade is centered as respects the body of the blade. This may be necessary from time to time owing to almost unavoidable variations in the wearing quality of the grinding wheels. By the former adjustment through electro-magnets U and L, however, the wheels are adjusted to compensate for normal substantially equal wear. This adjustment is automatic.

GR (Fig. 1) is the gage regulator. This comprises a pair of horizontally disposed insulated conducting disks 87 (see Figs. 3 and 4). These disks are mounted upon opposite sides of, but insulated from, a central pin toothed wheel 88 and are themselves provided with oppositely disposed V-shaped teeth 89, spaced a blade length apart. The wheel 86, 87, 88 is journaled in a U-shaped bracket 90 connected with the right hand work holder WH of the edge grinder EG, and the spindle 91 of the wheel is vertically adjustable in its bearings by means of a set screw 92 engaging its lower end. One arm of bracket 90 carries an insulated brush 93, while the other arm carries a similar brush 94, bearing respectively on disks 87 and the pin tooth wheel 88 engages its teeth in apertures $a$ of the strip 10 in such relation to the teeth 89 of disks 87 that the teeth 89 engage the strip 10, if at all, at the lines $b$ of weakened section which define the blades. Thus teeth 89 engage the strip at the extremities of the blades, whereby dulling of any part of the cutting edge is avoided. Normally the contact teeth 89 do not engage the strip 10, but should the width of the blade as ground by wheels 70 increase beyond normal, due to wear of the grinding wheels, contact is immediately made through teeth 89 with one edge or the other. If contact is made with the upper edge of the strip 10 (see Fig. 10), circuit 95 is closed through brush 94 to energize relay 96, which relay is of the slow acting type and controls by its contact 97 the upper electro-magnet U. Immediately magnet U steps its ratchet 80 one step or more, adjusting the upper pair of wheels 70 toward each other to increase the depth of their cut and decrease the gaged width of the blade. By its upper contact 88, relay 96 closes a locking circuit 99 for itself, but the other branch of circuit 95 includes in series a loop 100 including normally closed contacts 102 of magnet U. Thereby when magnet U pulls up, the circuit of relay 96 is broken. By reason of this arrangement all breaking of the circuit at the teeth 89 of gage plates 86 is avoided, thereby eliminating arcing at the teeth 89 which would not only wear the teeth, but cause variation in the gage through oxidation. When contact is made by the teeth 89 of the lower plate 87, circuit 103 of slow relay 104 is closed, and through its contact 105 it closes the circuit of the lower electro-magnet L to adjust the lower pair of wheels 70 toward each other. Like the relay 96 it closes a locking circuit for itself over conductor 106 by contacts 107 and in turn has its circuit opened through the opening of a loop 100 at contact 101. It will be apparent that by reason of the provision on wheels 86 and 87 at intervals of a blade length a gage of the width is made for each blade, and that if one operation of magnets L or U is insufficient to correct variation in gage, the circuit is again closed when the succeeding tooth 89 engages strip 10, this being repeated for each tooth 89 until the adjustment of the width to normal has been effected. Obviously the time relation of the slow acting relays 96, 104, and the magnets L, U, may be made anything desired, and should be regulated with reference to the speed of strip 10, and the number of contacts possible per minute of strip 10 with teeth 89. The teeth 89 are preferably of finely tempered steel of a hardness greater than that of the tempered strip 10. Further, I prefer not to weaken the blade by notches at opposite extremities of the line $b$, but rather to weaken it by the other two means disclosed, whereby the width of the blade at the line $b$ is the same as it is in the body of the blade, and the gaging may be carried out at this point instead of at some other.

SM (Figs. 2 and 5) is the stropping mechanism. This mechanism is essentially similar to the edge grinding mechanism, except in the fact that there is provided no means for regulating the width of the blades by the adjustment of the stropping wheels. As in the case of the edge grinding mechanism, the four strop wheels 110 are supported in upper and lower pairs by arms 111 pivotally connected with upper and lower axes 112, 113 from which the stropping wheels are driven in the direction shown by the arrows by means of belt gearing 114. The stropping wheels 110 comprise body disks of any suitable material provided with a facing 115 of stropping material. They are continuously drawn toward each other and against the work by adjustable springs 116 interconnecting the arms 111. By means of thumb screws 117 passing through swiveled connections 118 with one of the arms of each pair, the tension of the springs may be regulated with any desired degree of nicety. Connecting with supporting frame 119 and lying between each pair of arms 111 are stops 120 having such dimensions and such positions that they constitute abutments which will engage the arms 111 and prevent the stropping wheels 110 from being drawn together should the blade strip 10 be suddenly withdrawn or broken. Upper shaft 112 is driven from lower shaft 113 by belt 121, and directly from the counter-shaft 123, from which all the mechanisms of the apparatus are driven. As clearly appears in Fig. 2, a work-holder WH is provided on each side of the set of stropping wheels 110 and rigidly connected with the frame 119. If desired there may be interpolated between the edge grinding mechanisms EG and stropping mechanism SM a honing mechanism of substantially the same construction as the edge grinding mechanism. Such a honing mechanism of course constitutes merely a duplication of the edge grinding mechanism, since its wheels are actually grinding wheels. However, if desired, an adjustment of the wheels 70 may be omitted, and springs 116 provided as in case of the stropping mechanism SM, or else manual adjustment may be relied upon. However, in case automatic adjustment is not omitted, the automatic system shown in Figs. 1, 3 and 10 may be duplicated, and regulated with greater nicety.

The unfinished blades are wrapped in strip form by a mechanism WM next to the stropping mechanism. This mechanism comprises a pedestal base 124 in which is supported in a suitable bearing 125 a hollow journal 126 several inches in interior diameter. This journal on one end carries a pulley 127 by which it may be rotated from the counter-shaft 123, and on the opposite end a large flange or frame 128 upon which are mounted on symmetrically positioned axes 129 diametrically opposite each other reels 130 of paraffined paper or other wrapping material in strip form. Projecting through the journal 126 from the rear is an axially alined work holder WH' of the form shown in detail in Fig. 12. This work holder is substantially the same as the work holders WH excepting that its front end is elongated and projects through the journal 126, and on opposite sides of the channel 24 is provided with forwardly projecting blades 131, 132, the respective upper and lower edges 133 and 134 of which project slightly above the upper and lower edges respectively of the strip 10. These blades adjoin closely and preferably lie flatly against the opposite faces of the strip 10, and edges 133 and 134 taper forwardly to a point of minimum width, while the width of the respective blades 131, 132 is less in each case than the width of the strip 10. The wrapping material is fed from the reels 130 upon the strip 10 as it passes between the blades 131, 132, the frame 128 being driven at a high rate of speed and thus winding the wrapping strips from the reels in a double spiral, the angles of the axes 129 with respect to the transverse plane being such that the wrapping strips are properly fed. Assuming the strip 10 to be fed forward at a uniform rate of speed bearing a determinate relation to the speed of the wrapping mechanism WM, the wrapping takes place in a uniform manner as illustrated. By reason of the blades 113, the sharp edges of the strip 10 do not cut the wrapping strips, the paper being drawn from them by the movement of the blades as the wrapping proceeds, and pressed flatly to the strip and through the apertures a therein.

The strip feeding mechanism SF is that mechanism which draws the strip forward through the apparatus and which as an element of the wrapping mechanism presses the wrapping material upon the blade as aforesaid, and thus effectually withdraws it from the blades 131 and 132. Between the wrapping mechanism WM and the feeding mechanism SF, there are several turns of wrapping material around the strip, and as is well known, the existence of several turns of strip material around a given support greatly reduces the friction per turn necessary to hold the material against slippage. Obviously therefore since the actual direct tension of the strips of wrapping material is taken up over the dull edges of blades 131, 132, there is no danger of cutting the wrapping material after it is drawn from the blades 131, 132.

The strip feeding mechanism comprises pedestal base 135 from which is supported in vertical bearings 136 on each side of strip 10 a shaft 137 bearing at its upper end a feed and presser roll 138. Lost motion is provided in any suitable manner in bearings 136 and shafts 137 are drawn toward each other by spring 139, while at their lower ends they are geared together by gears 140 and driven from shaft 123. One of the presser rollers 138 is provided with conically shaped pin teeth 141, while the other is provided with face recesses in which these teeth are received during the rotation. This wheel is shown in Fig. 13. The presser rolls 138 may be suitably heated if desired to stick paraffin strips or other suitable material to each other and to the blade strip 10 whereby the blades are hermetically sealed. If sufficient paraffin is used the seal is hermetical whether cold or hot.

The strip 10 passes freely from the feeding mechanism SF, and taking the form of a bow of sufficient size to play beyond the mechanism SF, it is engaged by a blade severing device BS. Like the other devices, this device is supported from rails 14, 15 by means of a pedestal 142 provided with the same means of longitudinal adjustment along the rails. It comprises two horizontally disposed star wheels 143, one on each side of strip 10, and driven in unison or synchronism from shafts 144, which like shafts 137 are geared together beneath rails 14, 15 by worm gearing 145, and driven from counter-shaft 123. Each star wheel 143 is shown as provided with four points 146, but a greater number of points may be provided if desired. Intermediate each adjacent pair of points is provided a pair of dull projections 147, the adjacent walls of which form a notch 148. The angularity of the walls of these projections, and hence the sharpness of their vertically disposed apexes, and the size and angularity of the notch between them, may be varied as desired. Essentially, however, the dimensions are such that when the wheels 143 are geared together in a 90° (or a 360/2n relation in which $n$ represents the number of points 146), the points 146 during revolution will project within the notches 148. The faces of wheels 143 are formed in vertically extending planes or surfaces, the points 146 are reasonably sharp and on the vertical faces are provided at intervals pin teeth 149 or complementary recesses 150. The strip 10 is entered between these wheels 143 with the pin teeth 149 in mesh with the proper aperture $a$ (see Fig. 14) to position the lines of weakened section $b$ precisely at the points 146, the distance between adjacent points 146 being substantially equal to two blade lengths. As clearly illustrated, as the wheels 143 revolve, they pass strip 10 forward between them, and as the weakened sections $b$ fall across notches 147, they are engaged by points 146 which project slightly into the notches and are broken, the points 146 engaging precisely at the weakened portion $b$, and the opposite walls of notch 147 on each side thereof. Preferably the points of the walls of notches 147 are well rounded or turned, whereby the wrapping is not cut during this breaking operation.

Obviously the blades are broken alternately from opposite directions. They thus take a zigzag form, and in this form pass into a short chute 150$^a$ of a transverse section approximately equaling the face area of the blades. At the outer end of this chute revolves the counting and packing spiral wheel 151 of the packaging mechanism PM. The spiral wheel 151 rotates on axis 152, and comprises a metallic strip of a width substantially equal to a blade length, bent into helical form and having a length of a little over one turn, the front end 153 projecting slightly beyond the rear end 154 and having its helicoidal pitch decreased gradually to zero. The pitch of the single turn of the spiral 151, and the number of turns thereof may be adjusted in accordance with the rate of operation of the apparatus being described, and the rate of speed of the strip 10. As shown, it is of such pitch as to engage one V of the strip 10 at a time, projecting transversely of chute 150 for this purpose, and as it rotates one V of the zigzag after another is caught by the spiral 151 and pressed forward. Obviously the number of turns might be increased so that any number of V's of the zigzag of strip 10 might be simultaneously engaged.

The outer end 153 presses the outermost V into a packaging pocket 155 on the revolving table 156. This table is of a well known type, containing on one face a number of wrapping pockets 155 and on the other (see Fig. 6) a number of cam surfaces or slots 157 by means of which it is driven step-by-step to present the pockets successively to be filled. The direction of rotation is shown by the arrow. Table 156 has a geared connection with the counting spiral 151, this connection comprising countershaft 157′ driven by gearing 158 from countershaft 123 (or some derivation thereof) and chain or other gearing connection 159 with shaft 152 which bears device 151. On shaft 157′ is an arm 160, the outer end of which bears a cam roller 161 which engages in cam slots 157 on the under side of table 156. The gearing roller illustrated is such that for each six revolutions of device 151, arm 160 rotates one revolution, and the shape of cam slots 157 as respects the path of rotation of roller 161 is such that during the latter part of the revolution of arm 160, table 156 is moved 45°, to present the next pocket of the eight provided to be filled. Shaft 157′ carries cam 162 which once in each revolution, immediately prior to the first movement of table 156 or just as this movement is about to begin or begins, operates cam lever 163 which rocks about shaft 152′ and carries at its upper end shaft 152, to move device 151 bodily to the left as shown by the arrow, whereby the front edge 164 of the advance end 153 engages and severs from each other the blades between which it lies. This it does by simply severing the paper wrapping which connects them, the edge 164 being sharpened for this purpose. Obviously with a gear ratio of 1–6, the device 161 counts six pairs of blades or an even dozen before table 156 is moved. Latch 165—166 positions pockets 155 immediately opposite the end of the chute 150, and the end 153 of device 151 presses each pair of blades as it is counted into the positioned pocket, and the last pair flush with the face of the table, the end 153 being preferably made flexible, and of sufficient tension to provide the desired degree of compression. The counted dozen being severed from the balance of strip 10 at this point, table 155 is rotated to present the next pocket, and the two blades on the then end of strip 10 fall into the pocket as it comes into position.

The counted blades may be placed in boxes by any suitable mechanism, a number of well known types being adapted for this purpose. If desired, of course, the boxes may be placed by an operator in pockets 155, and after the blades have been packed therein, the cover is placed in position or closed. A number of mechanisms are known to the art whereby the boxes are fed automatically to the packaging table and are automatically closed and delivered therefrom.

Such is the apparatus, and such the method of my invention. It is patently capable of practice by the use of apparatus in a large number of forms. I have herein disclosed only the best of these forms now known to me. So also the steps of the method of my invention may be varied somewhat without departing from the generic spirit of the invention. Moreover, one or more steps may be eliminated, or at least varied in point of the time at which they are carried out. I desire to cover in the annexed claims, all forms of my invention which come within its generic spirit.

As respects modification of the apparatus, it is pointed out that the wrapping mechanism WM, like the edge grinding mechanism and stropping mechanism, may be duplicated if desired, the second mechanism being used to apply an outer wrapping of an ornamental nature or containing advertising matter. This is mere duplication.

In the use of blades packaged in this manner, one blade at a time is torn from the remainder, and the spiral wrapping untwisted. Since the ends of the spiral wrapping are free, this may be accomplished with the greatest ease and facility irrespective of the adhesion of the inner hermetical wrapping.

In Fig. 11 I show a modified form of circuit connections for the temper detector. In this figure parts similar to those shown in Fig. 9 have applied thereto similar reference numerals. There are used two sensitive cells 55, 55', but instead of being connected by the petentiometer method they are respectively connected in the arms of a Wheatstone bridge 167. This bridge is fed from a source 168, against the electro-motive force of which the electro-motive forces of cells 55 and 55' are pitted. Variation in the electro-motive force of cell 55, therefore, as respects that of the gage cell 55', is measured by galvanometer 169, the pointer 170 of which controls circuits 63 and 65, and interrupter contacts 62 in its own circuit. Current flows in galvanometer 169 in one direction or the other, according to whether the electro-motive force of cell 55 is low or high as respects the value of the electro-motive force of cell 55'. The electro-motive force of cell 55 varies directly in accordance with the movement of light reflected from strip 10 as it passes before aperture 54 in the tube 53.

In Figs. 9 and 11, I have shown the circuit of the testing relay or magnet provided with contacts operated by the magnet, whereby it is made and broken each time the magnet is actuated, but instead there may be used a constantly revolving commutator C placed in the circuit as indicated. When the test relay makes and breaks its own circuit, this commutator C will rest idle in the position shown, but in case the circuit making and breaking contacts are not provided, a suitable motor will be provided for continuously rotating the commutator as well known in the art. The timing of this commutator may be adjusted to suit any desired conditions. Such commutators may also be used in the circuits of the relays used in connection with the gaging magnets of Fig. 10. In such case the rate of rotation of the commutator will be so related to the feeding movement of the strip that it breaks the circuit of the relays after the gage disks 87 have broken contact with the strip. The commutators should be placed in the locking circuits 100 or 100' in lieu of the contacts on the feed magnets L and U.

It is of course understood that the work holders WH may be moved as close to any of the grinding or other working elements as desired by simply adjusting the positions of the several mechanisms with respect to each other.

The upper and lower pairs of grinding wheels 70 may be segregated or incorporated in separate mechanisms, if desired, thus grinding one edge of the strip at one point and the other edge at another point in the progression of the strip. Furthermore the longitudinal overlap of the upper and lower wheels may be varied as desired in order to increase or decrease the diameter and vary the angular relation of the edges of the blade without interference between the wheels. Thus the overlap of the upper and lower wheels may be eliminated entirely, the wheels adjoining each other laterally as closely as practicable. There is thus no danger of interference between the bearing of one wheel and another wheel as might be the case if the wheels were of considerable diameter, or it were desired to grind the edge at a very acute angle.

The modification of Fig. 15 consists in the elimination of the perforation at the line of minimum cross sections $b$, reduction of thickness and edge notches alone being relied upon. In such case, however, the perforations $a$ are provided at regular intervals, as above, and preferably with one of them falling in the center of each blade section whereby the blade is adapted to be centrally supported in a holder of the Gillette type.

The cutting edge 154 of the spiral 151 of the blade-severing mechanism should be formed on a diameter slightly greater than that of the main body 153 whereby when the spiral is advanced to cut the wrapper to sever the blades there is no interference of the body portion 153.

The great advantages of the method of my invention should be fully apparent. One may operate the entire machine, and in doing so need give the several mechanisms but intermittent attention since normally all adjustments are automatic. By inspecting the product turned out and the operation of the various mechanisms from time to time he can supply such supplemental adjustment as is necessary, such for instance as bodily adjustment of the pairs of grinding wheels 70 to center the edge formed, and adjustment of the temper regulator to take care of any variations in the source of heating power or sources of light. When one strip is about used up he has merely to stop the machinery for a few minutes and then integrally unite (by welding or otherwise) the advance end of another roll of the strip with the end of the retiring strip with the perforations in proper relation and thereupon the operation may proceed without further interruption.

An important feature of the method of my invention is the resistance to movement of the strip imposed through the several work holders WH which frictionally bear upon the sides of the strip and thereby cause it to be placed under tension while being drawn forward by the feeding mechanism FM.

Springs 22 and 139 may connect with shafts 18 and 137 by means of collars, or may interconnect the bearing blocks themselves as indicated in Fig. 16.

The gears between the main drive shaft 123 and the several mechanisms are but illustrative of any suitable form of gearing.

The work holders WH may be adjustably mounted upon the supporting pedestals particularly for longitudinal adjustment thereof if desired.

The commutators C may be placed in conductors 63, 65 of Figs. 9 and 11 instead of being located as illustrated. In such case contacts 52 are entirely omitted and the circuit of magnet 60 or of galvanometer 169 is maintained normally closed.

The wrapping mechanism WM may be of any desirable form, and may operate to place the wrapping upon the strip longitudinally instead of spirally. Such wrapping mechanisms are very common in the art of wire making in which flat rubber strips are longitudinally lapped over the wire as it is fed and the meeting or overlapping edges sealed together under pressure. In case such longitudinal wrapping is preferred, I prefer to use two longitudinally fed paraffined wrapping strips, one on each side of the blade strip, and slightly wider than the blade strip whereby their edges overlap on each side of the blade strip and may be sealed together by the pressure of heated rollers on the overlapping edge portions, the overlapping edges being paraffined on their adjacent faces.

Still other modifications are possible in the apparatus, as well as in the method of my invention without departing in any wise from the generic spirit thereof.

What I claim is:

1. The method of making razor blades which consists in shaping the bulk material into strip form, displacing portions of the body thereof at intervals to form walls by means of which the strip may be held against edgewise movement, feeding the strip longitudinally, supporting it against edgewise movement while so fed by means of said walls, forming the strip into a connected series of blades while so fed and supported, and thereafter severing it into suitable lengths.

2. The method of making razor blades which consists in commencing with the bulk material in strip form, displacing portions of the body thereof at regularly recurring intervals to form walls by means of which the strip may be held against edgewise and longitudinal movement and by means of which the blades when formed may be supported in a suitable holder, feeding the strip longitudinally, supporting the strip while so fed against edgewise movement by means of said walls, forming the strip while so fed and supported into a connected series of blades and thereafter severing it into suitable lengths.

3. The method of making razor blades which consists in shaping the bulk material into strip form, as it is so shaped displacing portions of the body thereof at intervals to form walls by means of which the strip may be held positively against edgewise movement, feeding the strip longitudinally, supporting it against edgewise movement while so fed by means of said walls, forming said strip while so fed and supported into a connected series of blades, and thereafter severing it into suitable lengths.

4. The method of making razor blades which consists in commencing with the bulk material in strip form, displacing portions of the body thereof at intervals to form walls by means of which the strip can be supported positively against edgewise movement and can be positively fed longitudinally, feeding said strip longitudinally by engagement of said walls, supporting it the while against edgewise movement also by engagement of said walls, forming said strip while so fed and supported into a connected series of blades and thereafter severing said strip into suitable lengths.

5. The method of making razor blades which consists in commencing with untempered bulk material in strip form, displacing portions of the body thereof at regularly recurring intervals to form walls by means of which the strip may be held positively against edgewise movement, feeding the strip longitudinally, supporting it against edgewise movement while so fed by said walls, tempering the strip and thereafter forming it into a connected series of blades as it is so fed and supported, and finally severing said strip into suitable blade lengths.

6. The method of making razor blades which consists in commencing with the bulk material in the form of a strip, displacing portions of the body thereof at regularly recurring intervals to form walls, drawing said strip longitudinally, resisting the longitudinal draft of said strip whereby it is placed progressively under considerable tension, supporting said strip against edgewise movement the while by engaging said walls, forming said strip into a connected series of blades as it is so fed and supported, and thereafter severing the strip into suitable blade lengths.

7. The method of forming razor blades which consists in shaping the bulk material into strip form, displacing portions of the body thereof at regularly recurring intervals to form walls, separately weakening the strip transversely at regularly recurring intervals defining blade lengths, feeding said strip longitudinally, supporting it against edgewise movement the while by means of said walls, forming the strip into a connected series of blades while so fed and supported, and thereafter severing the strip into blade lengths by breaking it at the weakened points.

8. The method of forming razor blades which consists in commencing with the bulk material in strip form, displacing portions of the body thereof at regularly recurring intervals to form walls, separately decreasing the cross section of said strip at regularly recurring intervals defining blade lengths, feeding said strip longitudinally, supporting it against edgewise movement while so fed by engagement of said walls, forming the strip while so fed and supported into a connected series of blades, and thereafter severing the blades from each other by breaking the strip into lengths at said points of decreased cross section.

9. The method of forming razor blades which consists in commencing with the bulk material in strip form and displacing portions of the body of said strip at regularly recurring intervals defining blade lengths to form walls by means of which said strip may be positively held against edgewise movement, feeding said strip longitudinally, supporting it against edgewise movement the while by engagement with said walls, forming the strip while so fed and supported into a connected series of blades, and thereafter severing the strip into blade lengths at points defined by said displaced portions.

10. The method of forming razor blades which method consists in commencing with the bulk material in strip form, displacing portions of the body of said strip at regularly recurring intervals to form walls, feeding said strip longitudinally, supporting it the while against edgewise movement by engagement of said walls, forming it into a connected series of blades while so fed and supported, wrapping the blades in connected series, and breaking them apart after they are wrapped.

11. The method of forming razor blades which method consists in commencing with the bulk material in strip form, displacing portions of the body of said strip at regularly recurring intervals to form walls, feeding said strip longitudinally, supporting it against edgewise movement the while by engagement of said walls, forming it while so fed and supported into a connected series of blades, and thereafter breaking said blades apart by transverse bending of the strip as it is fed.

12. The method of forming razor blades which method consists in commencing with the bulk material in strip form, displacing portions of the body of said strip at regularly recurring intervals to form walls, feeding said strip longitudinally, supporting it against edgewise movement the while by engagement of said walls, forming it while so fed and supported into a connected series of blades, and thereafter breaking said blades apart by bending the strip transversely alternately in opposite directions as it is fed.

13. The method of forming razor blades which method consists in commencing with the bulk material in strip form, displacing portions of the body of said strip at regularly recurring intervals to form walls, feeding said strip longitudinally, supporting it against edgewise movement the while by engagement of said walls, forming it while so fed and supported into a connected series of blades, wrapping the connected series of blades, and thereafter breaking said blades apart by bending them transversely to the breaking point alternately from opposite directions as they are fed, whereby there is formed a zigzag of blades interconnected by the wrapping.

14. The method of forming razor blades which method consists in commencing with the bulk material in strip form, displacing portions of the body of said strip at regularly recurring intervals to form walls, feeding said strip longitudinally, supporting it against edgewise movement the while by engagement of said walls, forming it while so fed and supported into a connected series of blades, wrapping the connected series of blades, and thereafter breaking said blades apart by bending them transversely to the breaking point alternately from opposite directions as they are fed, whereby there is formed a zigzag of blades interconnected by the wrapping and thereafter compressing the zigzag series longitudinally to form bundles.

15. The method of forming razor blades which method consists in commencing with the bulk material in strip form, displacing portions of the body of said strip at regularly recurring intervals to form walls, feeding said strip longitudinally, supporting it against edgewise movement the while by engagement of said walls, forming it while so fed and supported into a connected series of blades, wrapping the connected series of blades, and thereafter breaking said blades apart by bending them transversely to the breaking point alternately from opposite directions as they are fed, whereby there is formed a zigzag of blades interconnected by the wrapping, thereupon compressing the zigzag series longitudinally to form bundles, and cutting the connecting wrapping at intervals to finally dissociate the blades in groups.

16. The method of forming razor blades which consists in commencing with the material in strip form, feeding said strip longitudinally, forming it while so fed into a connected series of blades, wrapping the connected series of blades as it is formed and thereafter severing them from each other.

17. The method of forming razor blades which method consists in commencing with the material in strip form, displacing from the body thereof portions forming walls at regularly recurring intervals, feeding said strip longitudinally, supporting it against edgewise movement the while by engagement of said walls, forming it while so fed and supported into a connected series of blades, thereafter severing said strip into blade lengths, and when said strip is nigh exhausted integrally uniting another strip thereto with its displaced portions in uninterrupted series with the displaced portions of the first.

18. The method of making razor blades which consists in commencing with the bulk material in the form of a strip, feeding said strip longitudinally under tension, forming it into a connected series of blades while so fed, relieving the tension after formation, and progressively severing the strip into blade lengths as they are formed after the tension has been relieved.

19. The method of forming razor blades which consists in commencing with the bulk material in strip form, decreasing the cross section of said strip at regularly recurring intervals defining blade lengths, feeding said strip longitudinally, forming the same into a connected series of blades while so fed and thereafter separating the blades by fracturing the strip at said points of decreased cross section.

20. The method of forming razor blades which consists in commencing with the bulk material in strip form, weakening the strip at regularly recurring intervals defining blade lengths, feeding the strip longitudinally, forming it into a connected series of blades while so fed, and thereafter severing it into blade lengths at said weakened points.

21. The method of making razor blades, which consists in commencing with blade material in strip form having portions of its body displaced at intervals to form walls by means of which the strip may be held against edgewise movement, feeding the strip longitudinally, supporting it against edgewise movement while so fed by means of said walls, forming the strip into a connected series of blades while so fed and supported, and thereafter severing it into suitable lengths.

22. The method of making razor blades, which consists in commencing with said material in strip form, drawing said strip longitudinally, resisting the longitudinal draft of said strip whereby it is placed under considerable tension between the point of draft and the point of resistance, forming the strip during its longitudinal draft into a connected series of blades, and thereafter severing it into suitable lengths.

23. The method of forming razor blades, which method consists in commencing with blade material in strip form, moving said strip longitudinally, forming it during its longitudinal movement into a connected series of blades, progressively breaking said blades apart by transverse bending of the strips.

24. The method of forming razor blades, which consists in commencing with the blade material in strip form, feeding said strip longitudinally, forming it while so fed into a connected series of blades, applying a wrapping as the strip is fed and after the blades are formed, and thereafter breaking said blades apart without breaking the wrapping whereby they are maintained in the series in which formed by the wrapping material which has been applied.

25. The method of forming razor blades, which method consists in commencing with the blade material in strip form, feeding said strip longitudinally, forming it when so fed into a connected series of blades, progressively severing the formed strip into suitable lengths and when said strip is well nigh exhausted integrally uniting another strip thereto whereby the process may be continuously carried on.

In testimony whereof I affix my signature in presence of two witnesses.

JOHN P. TARBOX.

Witnesses:
  NANCY C. LOENTAL,
  EDNA L. HAMPTON.